March 26, 1946.  R. M. HEINTZ ET AL  2,397,351
SINGLE PURPOSE MACHINE
Filed July 29, 1943  7 Sheets-Sheet 1

Fig. 1.

INVENTOR.
RALPH M. HEINTZ.
JOSEPH F. STEIGERWALD.
LYSLE D. CAHILL.
BY
Frank H. Harmon
ATTORNEY.

Patented Mar. 26, 1946

2,397,351

UNITED STATES PATENT OFFICE 2,397,351

SINGLE PURPOSE MACHINE

Ralph M. Heintz, Cleveland, and Joseph F. Steigerwald and Lysle D. Cahill, Shaker Heights, Ohio, assignors, by mesne assignments, to Jack & Heintz, Inc., Cleveland, Ohio, a corporation of Ohio Application July 29, 1943, Serial No. 496,658

10 Claims. (Cl. 29—51)

This invention relates in general to a single purpose machine and has for its primary object to provide a machine in which a plurality of machining operations on a work piece may be accomplished automatically while the work is firmly fixed on its supporting mechanism.

Another object of this invention is to provide in such a machine an hydraulically impelled ram for supporting and automatically moving the work vertically into proper alignment for machining operations by a multiplicity of spindles at different levels.

Still another object is to provide in a single purpose machine a multiplicity of both fixed and extendable spindles mounted at different levels in horizontal planes, to provide individual motors for rotating the spindles, and to provide, for operation in coordination with the hydraulic control of the work supporting ram, hydraulic control for the spindles.

A further object is to provide a single purpose machine with an electrically interlocked hydraulic system for controlling the work supporting ram, and extendable and fixed spindles in specific cycles necessary in the machining of a piece of work.

Still another object of this invention is to provide in an hydraulic system for the control of the machining operations on a single purpose machine, a check valve and by-pass tubing arrangement to hold the pressure on the low pressure side of a piston up to such a value as to make a pressure responsive switch, operation of which is responsive to the fall of pressure behind the piston, dependent upon the bleeding of the pressure behind the piston through a by-pass tubing of relatively small diameter around the check valve.

With the foregoing and other objects in view, the invention resides in the combination of parts and in the details of construction and operation hereinafter set forth in the following specification and appended claims, certain embodiments thereof being illustrated in the accompanying drawings in which:

The term "single purpose machine" is used throughout this specification in its generally accepted sense to designate a machine for automatically performing a plurality of different operations on a particular work piece to convert it from a rough casting or the like into a substantially completed part. The term is applicable notwithstanding the fact that some operations may be completed prior to the work of the single purpose machine, and other steps may remain to be accomplished after removal from the machine. The present disclosure relates by way of example to the precision facing and boring operations on a work piece comprising a gyro gimbal frame for use in aircraft automatic pilots and flight instruments. These are not the only operations to be performed on this particular work piece, but the trueness and relationship of these bores and faces are critical to satisfactory operation of the finished instrument and are very difficult to accomplish satisfactorily in volume production on separate machines. The present single purpose machine, by performing related operations by tools on a common base, and with a single chucking or clamping, achieves speed and precision hitherto considered impossible in this class of work.

Figure 2:
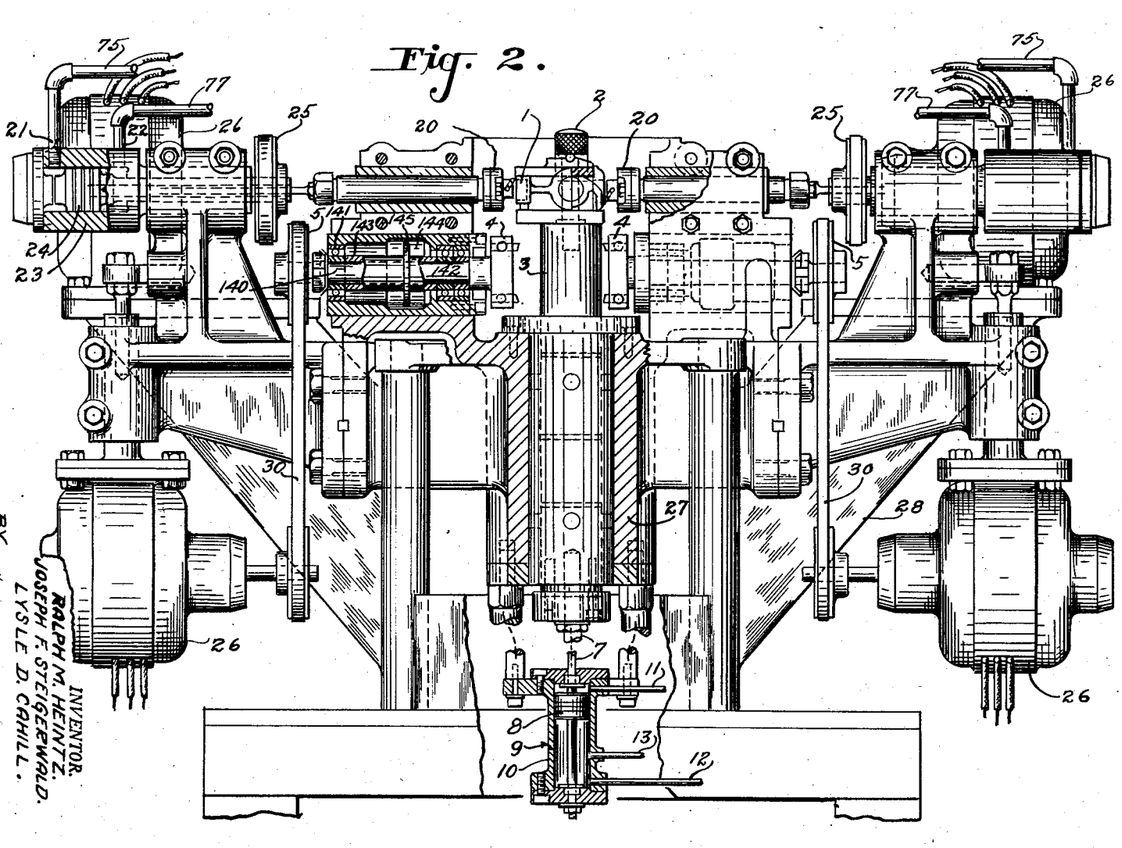
Figure 2 is a view taken through section 2—2 of Figure 1 showing a work supporting, hydraulically controlled ram holding work in alignment with a set of extendable cylinders for a machining operation.

Referring more particularly to Figure 2, a piece of work 1 is shown in its initial position, prior to machining, fixed in place by a clamping device 2 on the surface of an hydraulically actuated ram 3.

Figure 4:
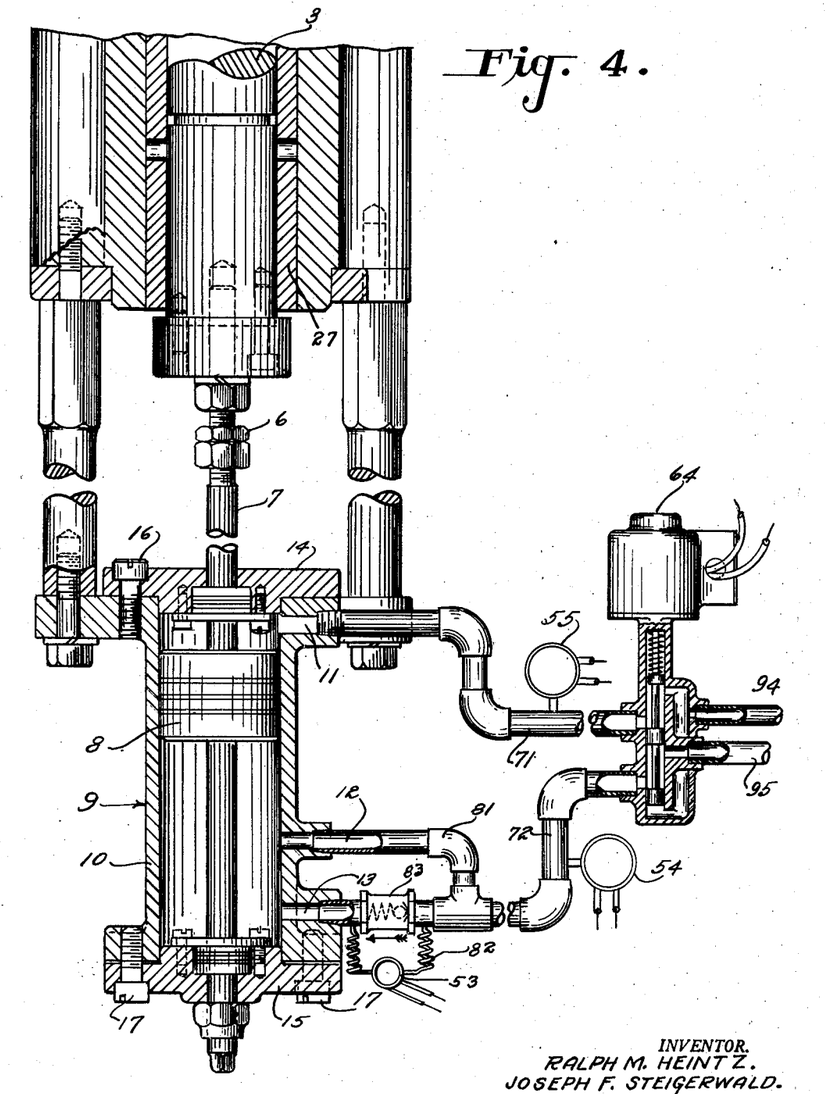
Figure 4 is an enlarged and more detailed view of the ram controlling piston, as shown in the lower portion of Figure 2, and in addition provides a sectional view of a four way valve which controls fluid flow to either side of the ram piston.
Figure 5:
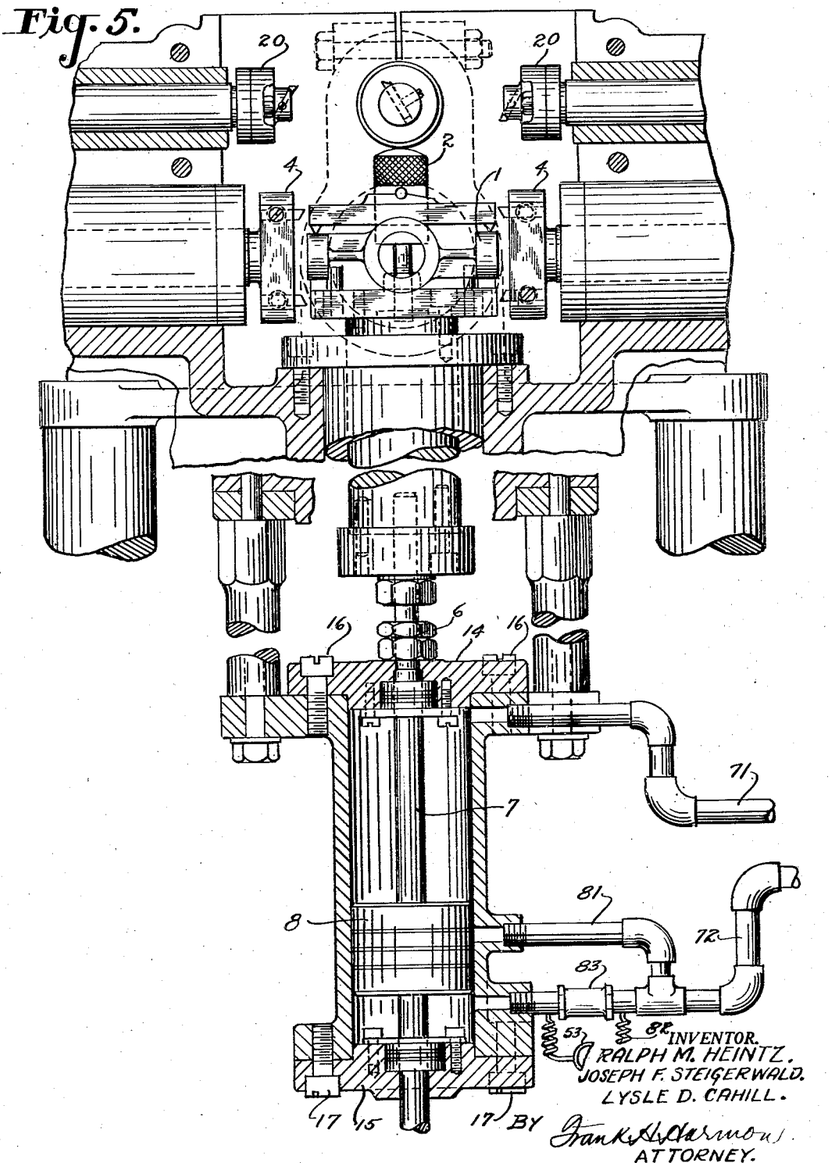
Figure 5 is a partial view of the machine showing the ram control piston in the retracted position and the work at the end of a facing operation by the lower set of spindles.

Upon the momentary closure of a master switch in the control circuit of the machine, description of which will follow later in this specification, electric motors 26 drive a lower set of spindles 4 by means of a belt 30 between said motors and pulleys 5 which are shown mounted on the spindles. The ram 3 is adjustably connected by means of a suitable screw and locknut arrangement 6 to a piston rod 7, as best shown in Figure 4. This piston rod forces the ram 3 either upward or downward depending upon the amount of pressure exerted on either side of a piston 8 in an hydraulic cylinder 9. Hydraulic pressure for this cylinder is controlled by an electrically interlocked hydraulic system which will be described later in this specification.

The hydraulic cylinder 9 is made up of a cylindrical body portion 10, having three ports 11, 12 and 13, and two circular caps 14 and 15 sealing the cylinder by use of bolts 16 and 17.

When fluid under pressure is pumped through port 11 into the ram cylinder, the piston 8 moves downward, and the pressure below the piston falls rapidly as the fluid is permitted to flow through port 13 back to a fluid reservoir. As the piston covers port 13 in its rapid traverse downward, its speed is checked to the desired feed rate of the work at the opposite end of the ram in the first machining operation by means of a metering tube 82 which by-passes a check valve 83 in the line from port 12. A fuller description of the purpose and operation of the metering tube will be given later in this specification in connection with the explanation of the hydraulic system.

As the pressure below the ram piston falls during the bleeding of fluid through by-pass metering tube 82 around the check valve 83, a pressure operated switch 54 is actuated which in turn operates a solenoid valve 64 that alters the flow of the fluid by sending it under pressure from a fluid pump back through check valve 83 and through ports 12 and 13 into the ram cylinder. The valve 64 at the same time releases the pressure from the opposite side of the ram piston 8 allowing the fluid to flow from port 11 back to the reservoir through pressure valve 66. The piston 8 is forced upwards in rapid traverse to the top of the cylinder. The work is then in its original position and is in alignment for a second machining operation by a set of extendable tool carrying spindles 20. These spindles are also belt driven by electric motors 26 using pulleys 25. The consequential fall in pressure on top of the ram piston 8 has caused other pressure switches and another solenoid valve 65 to operate. Details of these operations follow later in the specification. This second valve 65 sends fluid under pressure into a cylinder 23 by means of a port 21, while the fluid is released from the cylinder on the opposite side of a piston 24 through port 22 back to the reservoir. The rate of movement of piston 24 from the back to the front of cylinder 23 is controlled by a metering tube in the line leading from port 22. It may be seen that various desired feed rates of spindle 20 may be had by regulating the movement of the piston 24 with a metering tube of suitable cross-sectional area and length in the hydraulic system. As the metering tube which by-passes a pressure valve in the line from port 22 bleeds the fluid under pressure from cylinder 23, a pressure actuated switch indirectly operates the solenoid valve 65. This valve in turn directs fluid under pressure from the fluid pump back through port 22 into cylinder 23, and at the same time releases the pressure on the fluid on the opposite side of the piston by permitting it to flow directly back to the reservoir. The operation of the pressure switch also causes the driving motors to be turned off. The spindles then stop rotating quickly due to the friction created between the piston under pressure contacting its cylinder head as said piston completes its stroke in extending the spindles. The piston 24 moves in rapid traverse back to its retracted position, and, as it reaches the end of its stroke, a controlling pressure switch causes relays in the electrical control circuit to become energized which in turn close a circuit through a luminous indicator showing that the machining operations have been completed. The clamp 2 is disengaged and the finished work is removed by an operator who then repeats the cycle with another piece of work.

Figure 1:
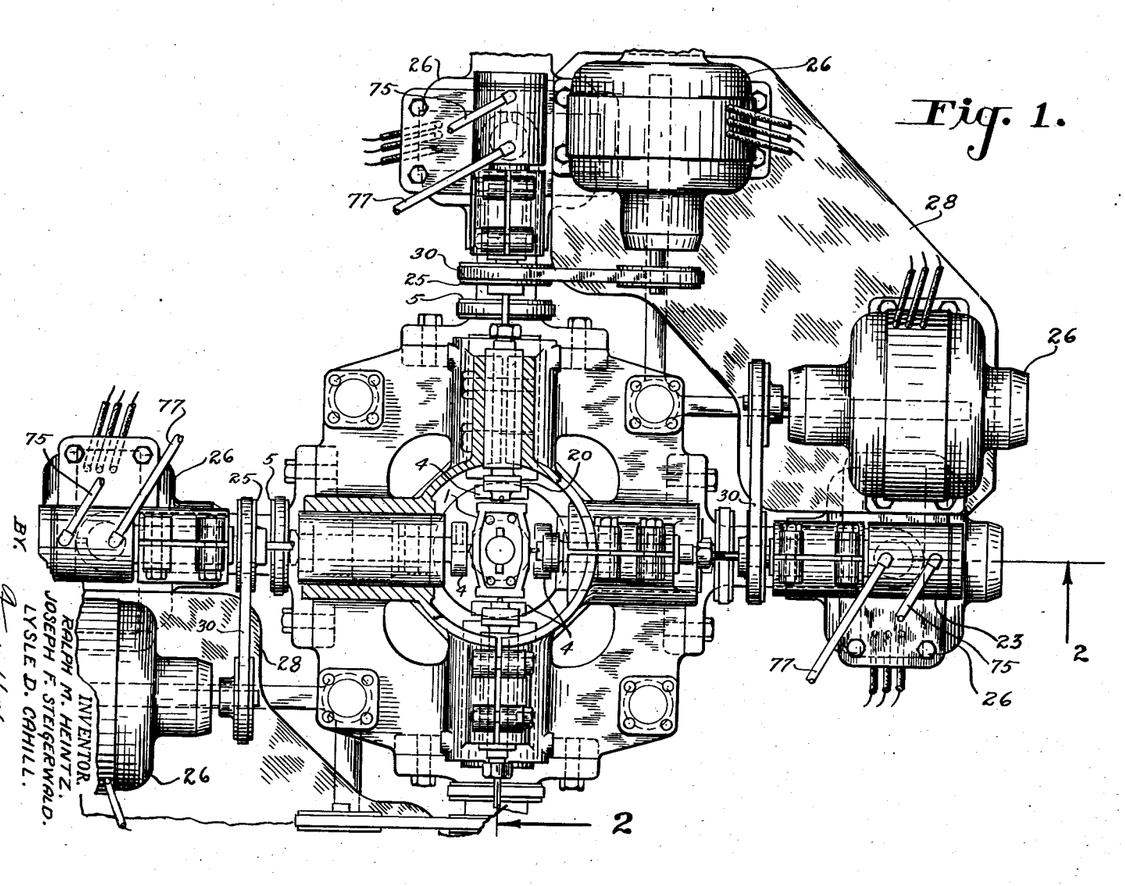
Figure 1 is a top view of a machine, less controls, embodying the principles of the invention.

Referring to the top view Figure 1 for a clear illustration of the symmetry of construction of the machine in part, the work 1 is shown in its normal position for a machine operation on the surface of the ram. The machine as partially shown has four similar spindles in each of two planes at right angles to each other in the horizontal plane, although it is understood that any convenient number of spindles positioned at different levels could be used to accomplish the machining operations necessary on work of various shapes and sizes. The extendable spindles 20, are shown in the retracted position directly above fixed spindles 4.

Suitable supporting framework 28 for the eight conventional motors 26, the spindle cylinders 23, the spindles 4 and 20, the ram cylinder 9 and the ram sleeve bearing and housing 27, is constructed in such a manner as to insure precision movement of the moving parts of the machine with as little bulk as possible. This framework consists of several sections securely bolted together. The eight motors are mounted on the frame so that their pulleys will rotate in the desired direction and parallel with the pulleys of the spindles 4 and 20. It is realized that four motors could, by having two pulleys on their shafts, drive all eight spindles, but eight motors are used with only one belt drive pulley attached to each rotor shaft in order that the motors may have a rest period between each operation, instead of having to run continuously. Also, it is desirable to have the rest period, provided when eight motors are used, in order to keep the rotating piston 24 in cylinder 23 from becoming excessively heated.

Figure 3:
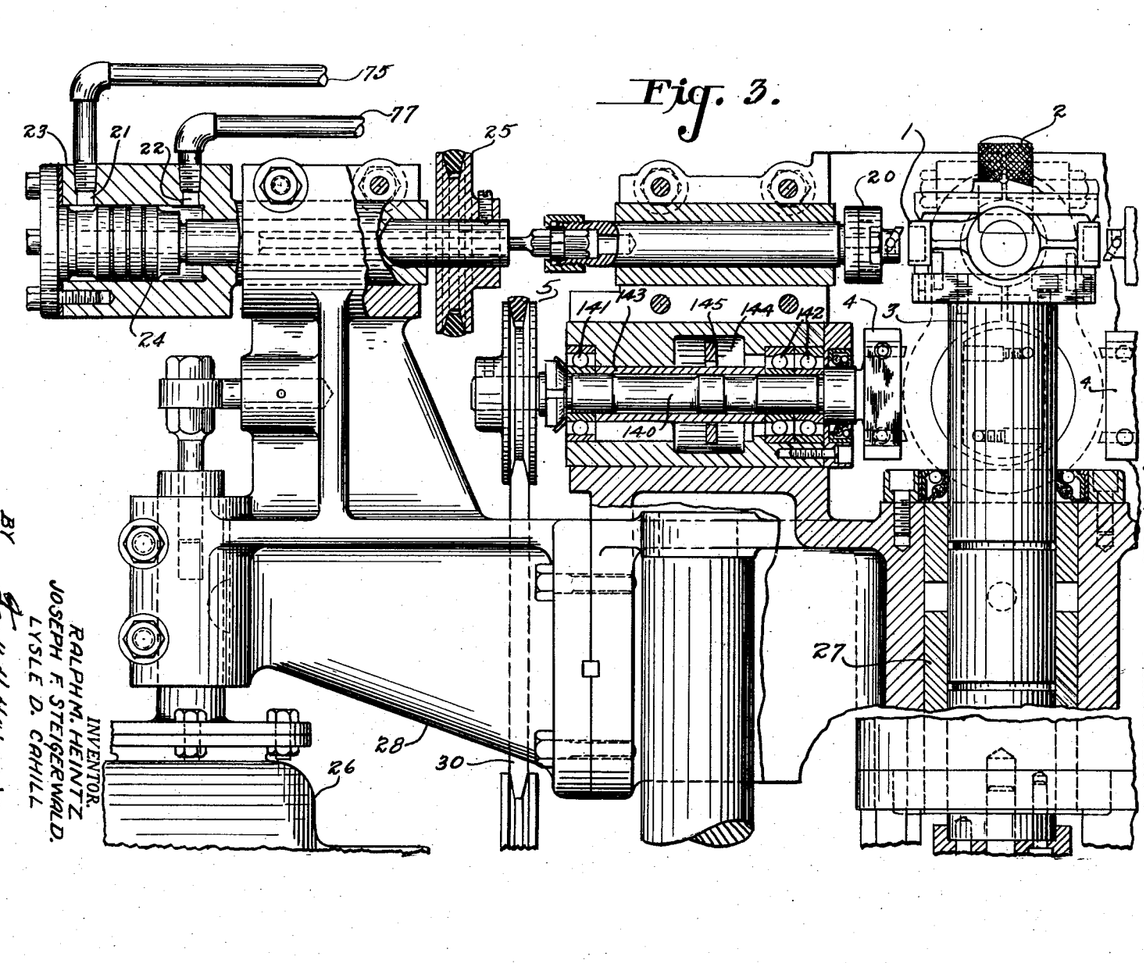
Figure 3 is an enlargement of a portion of Figure 2.

As shown in Figures 2 and 3, the spindle 4 includes a shaft 140 mounted in bearings 141 and 142 which prevent axial movement of the spindle. Surrounding the shaft 140 is a sleeve 143 to space the above mentioned bearings. Intermediate these bearings is an oil well 144 for lubricating these bearings. An oil ring 145 rides freely on the sleeve 143 with its lower portion in an oil bath in the well 144 to pick up lubricant in a manner well understood in the art.

The controlling circuits for this machine, both hydraulic and electric, could be housed under the same housing which is provided to protect the motors, spindles, and belts from chips of the machining operations, but for convenience of servicing and adjustment, these controls are separately housed.

Figure 6:
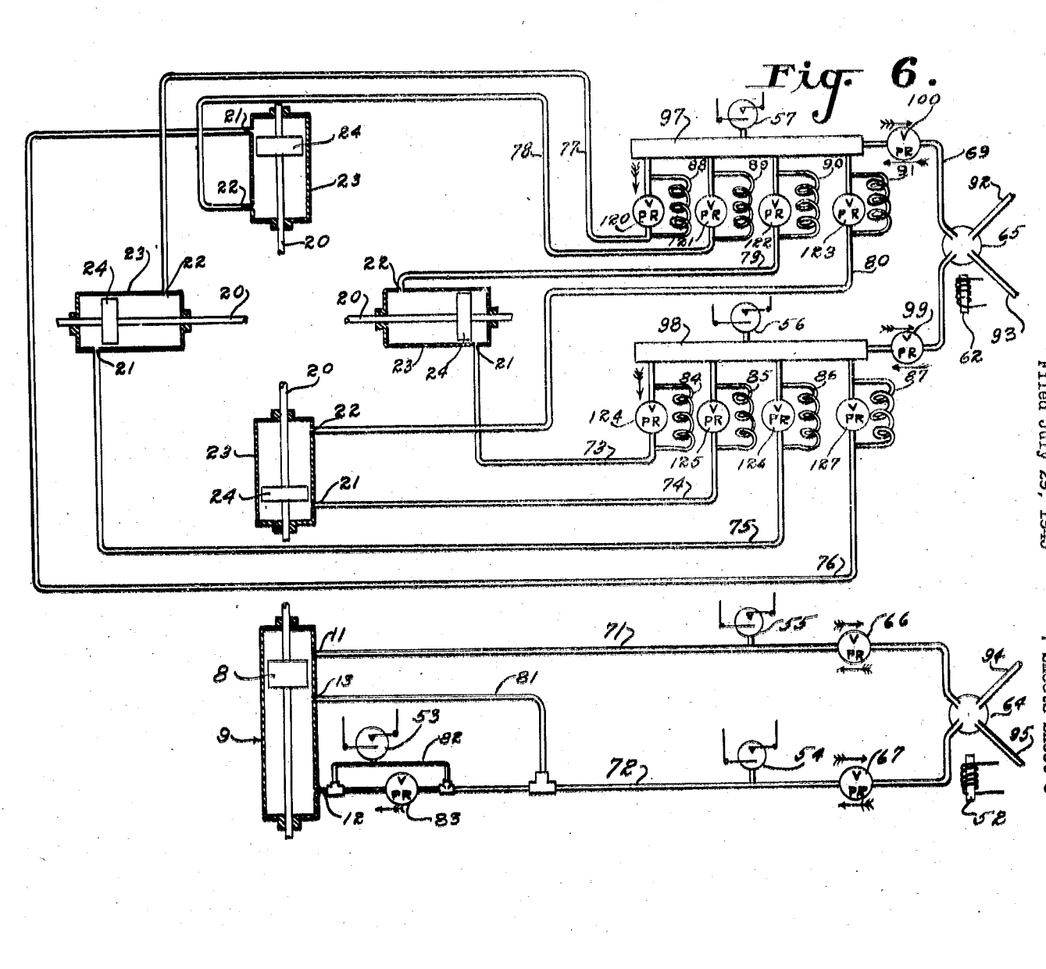
Figure 6 is a diagrammatic drawing of an hydraulic system for controlling the movements of the extendable spindle pistons and the ram piston of the machine.
Figure 7:
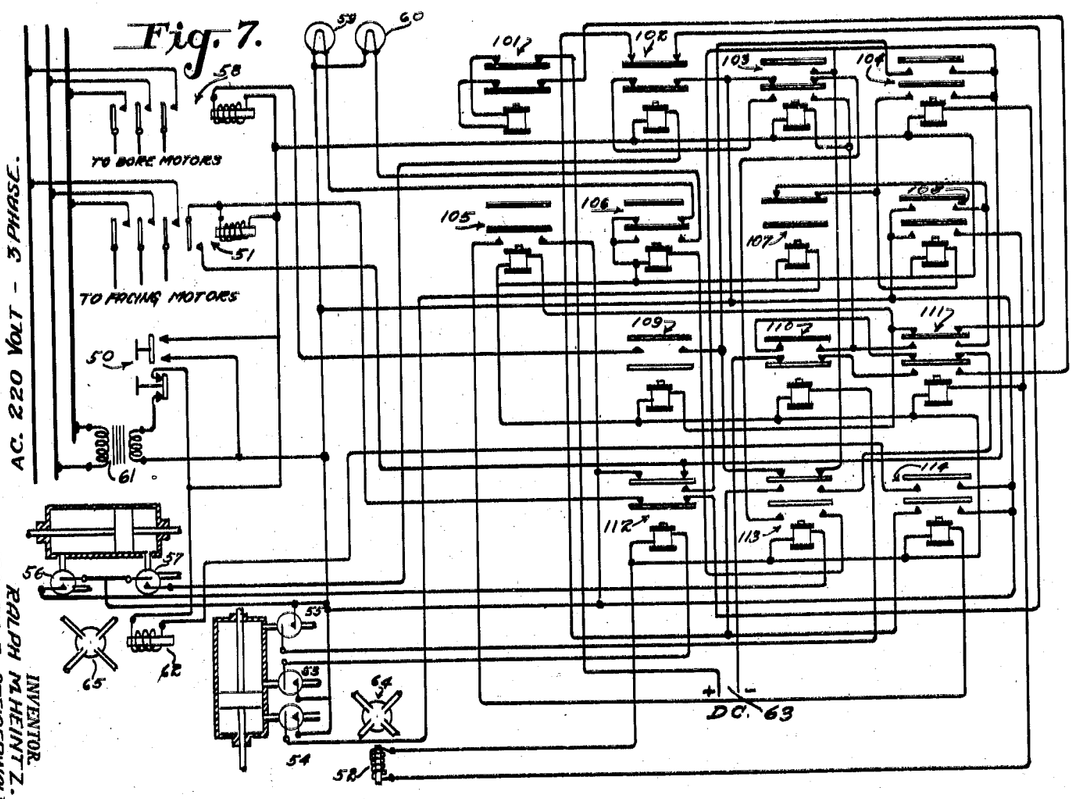
Figure 7 is a diagrammatic view of an electrical circuit for controlling the operation of the spindle motors and the hydraulic system of the machine.

The hydraulic and electric systems respectively are shown diagrammatically in Figures 6 and 7, and description thereof can best be understood by the sequence of operation of the various elements.

The conventional driving motors are connected as shown in Figure 7 to a three phase 220 volt line, while power for the control circuit is obtained through transformer 61 which is shown in Figure 7 connected to only one phase of the line.

After clamping the work in position for machining on the surface of the ram as previously described, a switch 50 is closed momentarily which causes relays 101, 104, 108 and 111 to become energized, and magnetic switch 51 to operate, thereby turning on the driving motors of the lower set of spindles on the machine. A circuit through relay 106 is also established illuminating a red light indicator 59, the purpose of which is to show that the machine is in operation. A solenoid 52 controlling a four way valve 64 is energized through relay 108. With the solenoid energized the piston of valve 64 is forced downward aligning ports in the valve wall in such a manner as to permit fluid under the pressure created by a fluid pump, not shown in the drawings, to flow through a two-way check valve 66 in line 71 to the top of the ram cylinder forcing the ram piston downward. Simultaneously, other ports in the valve 64 become aligned permitting the fluid below the ram piston to flow back to a fluid reservoir through an unrestricted line 81 to line 72, and through metering bleed tube 82 around check valve 83 into line 72, from which it is directed through a two way check valve 67 in the line 72 to a reservoir line 95 by the valve 64.

The ram piston will move downward rapidly until it passes and covers the port 13 to which line 81 is connected. The purpose of this bypass line 81 is to permit rapid traverse of the piston down to the point where the work approaches the machining tool, at which point a slower feed rate is generally desired. The feed rate is determined by the length and cross-sectional area of metering tube 82.

As the downward stroke is completed, the fall in pressure under the piston 8, occurring as the metering tube 82 bleeds out the remaining fluid, causes the pressure switch 53 to close and relay 112 becomes energized. The relay 112 de-energizes the magnetic switch 51 causing the facing motors to stop. Relay 104 becomes de-energized, but relays 108 and 111 which were originally energized through 104 remain energized by a locking circuit through the upper contacts of relay 107. Relay 101 also becomes de-energized as relay 112 cuts off the facing motors permitting direct current from a D. C. supply source 63 to be led momentarily through relays 110, 111 and 101 to the field of the motors shut off by switch 53 in order to stop their rotation by dynamic breaking. The purpose of the dynamic breaking action is to stop the rotation of the motors driving the tool carrying spindles in order that no tool marks will be made on the faced surface of the machined work as it is carried upward by the ram.

Switch 54 closes upon the drop of the remaining pressure in line 72, and relay 107 is energized, thereby de-energizing relays 108 and 111. When coil 111 becomes de-energized, the solenoid 52 on the four way valve 64 also becomes de-energized and the piston of valve 64 moves upward under spring tension to its original position. Ports in the valve wall are brought into alignment by the movement of the valve piston so that the fluid under pressure of the fluid pump is directed from line 94 into line 72 through the two way check valve 67, check valve 83, and into the bottom of the ram cylinder where it forces the piston up in rapid traverse. The two way check valve 66 in line 71 permits the fluid to flow back through valve 64 to the reservoir, but at the same time maintains enough back pressure in line 71 to keep the switch 55 from closing before the ram piston 8 completes its upward stroke. Also, when relay 111 is de-energized, relays 105, 109 and 114 become energized, and the D. C. circuit is broken at relay 111.

A delaying action in the operation of relay 105 momentarily prevents relay 114 from being energized in order to allow the ram to reach its extended position before permitting solenoid 62, controlling the 4 way valve 65 for the extendable spindle cylinders, to become energized.

As the ram piston arrives in rapid traverse at the top of the cylinder pressure switch 55 closes due to the drop of pressure in line 71. Relay 110 becomes energized and in turn energizes relay 103 which becomes locked in the energized position by a circuit through relay 102.

The piston of the second 4 way valve 65, whose controlling solenoid 62 has now been energized through relay 114, aligns itself with a port leading to line 92 so that fluid under pressure is directed through two way check valve 99 into manifold 98 through check valves 124, 125, 126 and 127 to lines 73, 74, 75 and 76, and into the rear of each of the cylinders 23 controlling the extendable spindles 20. It is directed away from the opposite ends of the cylinders by lines 77, 78, 79 and 80 which are manifolded together, the manifold 97 being connected by line 69 through two way check valve 100 and valve 65 to reservoir line 93. Check valves 120, 121, 122 and 123 are situated in lines 77, 78, 79 and 80 with by-pass metering tubes 88, 89, 90 and 91 around each one of them, respectively. The length and cross-sectional area of these metering tubes is predetermined to give the desired feed rate of the spindles 20.

As the spindles 20 emerge toward the work, switch 56 is opened and relay 113 is de-energized. The upper contacts of relay 113 then complete a circuit through relay 109 to energize the magnetic switch 58, thereby switching on the motors for the upper set of boring spindles.

The purpose of having two way check valve 100 in line 69 is to maintain enough back pressure in manifold 97 to keep a pressure switch 57 from closing prior to the completion of the extension of spindles 20. The pressure switch is set to close at a pressure slightly higher than the setting of the check valve 100.

As the machining operation is finished, that is when the spindles are fully extended, the fall in pressure in manifold 97 is enough to close pressure switch 57 which is shown connected to the manifold. Closing switch 57 energizes relay 102 and causes relays 105, 109 and 114 to be de-energized, thereby switching off the motors by de-energizing the magnetic switch 58, and de-energizing the solenoid 62 by breaking the circuit at the lower contact of relay 114. The spindles cease rotating quickly due to the friction encountered by their respective rotating pistons as they contact the ends of their cylinders under pressure.

As the solenoid 62 becomes de-energized, the piston of valve 65 moves under spring tension back into its normal position and ports in the valve wall are aligned by the piston so as to permit fluid under pump pressure from line 93 to pass to the manifold 97 through line 69 under control of two way check valve 100. Simultaneously fluid from manifold 98 is directed through two way valve 99 to valve 65 and into sump line 93. The spindles retract in rapid traverse to their original position. The rate of traverse is determined by the use of metering tubes 84, 85, 86 and 87 which by-pass check valves 124, 125, 126 and 127 respectively, the tubes being of such a length and cross-sectional area to give a desired traverse rate. As the spindles retract, switch 57 opens and de-energizes relay 102 but has no other effect on the circuit. As the pistons reach the retracted position the back pressure previously held up by two way check valve 99 drops in manifold 98 causing pressure switch 56 to close. The closing of switch 56 energizes relay 113 which in turn energizes relay 106 and causes a green light 60 to go "On" indicating the completion of the machining operation.

We claim:

1. A single purpose machine having extendable and fixed spindles mounted at different levels and a movable work holding ram mounted centrally with respect to said spindles and having means responsive to a pressure drop below the ram controlling piston for applying dynamic braking to the motors driving the lower set of spindles to stop the rotation of said spindles immediately after the driving motors have been switched off.

2. In a single purpose machine having extendable boring spindles at one level and fixed facing spindles at a lower level and having a work supporting ram mounted centrally with respect to said spindles, means responsive to work travel across the path of the tools of the facing spindles as the ram descends to stop rotation of the facing spindle driving motors, means to reverse the path of traverse of the work supporting ram, forcing same back into alignment with the boring spindles, means responsive to the arrival of the work in alignment with the boring spindles for initiating operation of said spindles, and means responsive to the completion of the traverse of the boring spindles into the work for retracting said spindles and for switching off the spindle driving motors.

3. In a single purpose machine having extendable boring spindles in one plane and fixed facing spindles in a second plane parallel to the first plane and having a work supporting ram mounted centrally with respect to said spindles and at right angles to said planes, hydraulic means responsive to work travel across the path of the tools of the facing spindles as the ram descends to stop rotation of the facing spindle driving motors, hydraulic means to reverse the path of traverse of the work supporting ram forcing same back into alignment with the boring spindles, hydraulic means responsive to the arrival of the ram in alignment with the boring spindles for initiating operation of said spindles, and hydraulic means responsive to the completion of the traverse of the boring spindles into the work for retracting said spindles and for switching off the boring spindle driving motors.

4. In a single purpose machine comprising a multiplicity of fixed and extendable spindles mounted in different parallel planes, a movable work holding ram mounted centrally with respect to said spindles and moving at right angles with respect to said planes, an electrically interlocked hydraulic control system, pressure and relief lines leading to cylinders controlling said ram and said extendable spindles, four-way, solenoid actuated valves to direct fluid flow in said pressure and relief lines, two-way check valves located in said pressure and relief lines, pressure actuated electric switches in said pressure and relief lines, and metering tubes by-passing check valves in said pressure and relief lines, solenoid valve means to direct fluid under pressure into and out of said pressure and relief lines, two-way check valve means to control the fluid flow into said pressure lines and to maintain a back pressure in said relief lines, metering tube means in said relief lines to control the rates of traverse of said extendable spindles and of said ram, means responsive to pressure drops in said relief lines to cause said pressure switches to close and means responsive to the closure of said pressure switches to cause said four-way, solenoid actuated valves to direct the fluid flow in the opposite direction through the hydraulic system making pressure lines out of former relief lines and relief lines out of former pressure lines.

5. A single purpose machine having extendable motor-driven tool spindles at a first station constituting a loading station, fixed motor driven tool spindles at a second station, a work supporting ram mounted centrally with respect to said spindles for movement between said stations, work clamping means on said ram accessible for clamping and unclamping a work piece at said loading station, means to move said ram from said first station to said second station, means effective upon completion of the ram movement to said second station to stop rotation of the fixed spindle driving motors, means to move said ram from said second station back to said first station, means effective upon the completion of the ram movement to said first station for initiating rotation and extension of said extendable spindles, and means effective upon the completion of the traverse of said extendable spindles into the work for retracting said spindles and for switching off the spindle driving motors.

6. A single purpose machine having extendable motor-driven tool spindles at an upper level constituting a loading station, fixed motor driven tool spindles at a lower level, a work supporting ram mounted centrally with respect to said spindles for vertical movement between said two levels, work clamping means on said ram accessible for clamping and unclamping a work piece at said loading station, means to move said ram from said upper level to said lower level, means effective upon completion of the ram movement to said lower level to stop rotation of the fixed spindle driving motors, means to move said ram from said lower level back to said upper level, means effective upon the completion of the ram movement to said upper level for initiating rotation and extension of said extendable spindles, and means effective upon the completion of the traverse of said extendable spindles into the work for retracting said spindles and for switching off the spindle driving motors.

7. A single purpose machine having extendable motor-driven tool spindles at a first station, hydraulically actuated pistons in cylinders for traversing said spindles, fixed motor driven tool spindles at a second station, a work supporting ram mounted centrally with respect to said spindles for movement between said stations, an hydraulically actuated piston in a cylinder for traversing said ram, means responsive to pressure drop on the discharge side of said ram piston upon completion of the ram movement to said second station to stop rotation of the fixed spindle driving motors and to move said ram from said second station back to said first station, means effective upon pressure drop on the discharge side of said ram piston upon completion of the ram movement to said first station for initiating rotation and extension of said extendable spindles, and means effective upon pressure drop on the discharge side of said spindle pistons upon the completion of the traverse of said extendable spindles into the work for retracting said spindles and for switching off the spindle driving motors.

8. A single purpose machine comprising a plurality of motor driven fixed and extendable spindles mounted at two stations for performing machining operations on a work piece, a work holding ram movable between said stations, hydraulically operated pistons in cylinders for traversing said extendable spindles and said ram, hydraulic lines constituting pressure and relief lines connected with opposite ends of said cylinders for transmitting and relieving hydraulic pressures to move said pistons in opposite directions, solenoid operated valves to admit and relieve operating pressures to and from said lines, check valves in said lines arranged to open in pressure lines and to close in relief lines, metering tubes by-passing said check valves to control the rate of flow in said relief lines and thereby control the rates of traverse of said spindles and ram, and pressure switches effective following pressure drops in said relief lines upon full traverse of said pistons for switching on and off said spindle motors and valve solenoids in step by step sequence to automatically perform a cycle of machining operations at said two stations, each step being initiated by completion of a preceding step.

9. A single purpose machine comprising a plurality of motor driven fixed and extendable spindles mounted at two stations for performing machining operations on a work piece, a work holding ram movable between said stations, hydraulically operated pistons in cylinders for traversing said extendable spindles and said ram, hydraulic lines constituting pressure and relief lines connected with opposite ends of said cylinders for transmitting and relieving hydraulic pressures to move said pistons in opposite directions, solenoid operated valves to admit and relieve operating pressures to and from said lines, check valves in said lines arranged to open in pressure lines and to close in relief lines, metering tubes by passing said check valves to control the rate of flow in said relief lines and thereby control the rates of traverse of said spindles and ram, a manifold communicating with the hydraulic lines connected in front of the extendable spindle pistons, a second manifold communicating with the hydraulic lines connected behind said pistons, pressure switches responsive to the drop in manifold pressure resulting from complete traverse of said extendable spindles, a first switch actuated upon completion of advance movement and a second switch actuated upon completion of return movement, and pressure switches responsive to the drop in pressure in each of the ram piston lines resulting from complete traverse of the ram in its two directions of movement, said pressure switches switching on and off said spindle motors and valve solenoids step by step to automatically perform a cycle of machining operations at said two stations, each step being initiated by completion of a preceding step.

10. A single purpose machine comprising a plurality of motor driven fixed and extendable spindles mounted at two stations for performing machining operations on a work piece, a work holding ram movable between said stations, hydraulically operated pistons in cylinders for traversing said extendable spindles and said ram, hydraulic lines for transmitting and relieving hydraulic pressures at opposite ends of said cylinders to produce operation of said pistons in opposite directions, solenoid operated valves in said lines, metering tubes in said lines, check valves by-passing said metering tubes for full unmetered flow in the pressure lines, said check valves closing upon reverse flow to produce metered flow in the relief lines, whereby said solenoid operated valves make pressure lines out of former relief lines and relief lines out of former pressure lines for advancing and returning said pistons, the rate of traverse being controlled by back pressure produced in the relief lines by said metering tubes, and pressure switches effective following drop of said back pressure resulting from full traverse of said pistons for switching on and off said spindle motors and valve solenoids step by step to automatically perform a cycle of machining operations at said two stations, each step being initiated by completion of a preceding step.

RALPH M. HEINTZ.
JOSEPH F. STEIGERWALD.
LYSLE D. CAHILL.